United States Patent
Jess et al.

(10) Patent No.: US 8,166,478 B2
(45) Date of Patent: Apr. 24, 2012

(54) SYSTEM AND APPARATUS FOR UTILIZING A VIRTUAL MACHINE TO SUPPORT REDUNDANCY IN A VIRTUAL MACHINE MANAGER PAIR

(75) Inventors: Martin Jess, Erie, CO (US); Timothy Snider, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 539 days.

(21) Appl. No.: 12/387,076

(22) Filed: Apr. 28, 2009

(65) Prior Publication Data
US 2010/0275198 A1 Oct. 28, 2010

(51) Int. Cl.
G06F 9/455 (2006.01)
G06F 12/00 (2006.01)

(52) U.S. Cl. ............ 718/1; 711/114; 711/162; 711/163
(58) Field of Classification Search ........................ 718/1
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 2008/0222633 A1 * | 9/2008 | Kami | 718/1 |
| 2009/0300605 A1 * | 12/2009 | Edwards et al. | 718/1 |
| 2009/0327606 A1 * | 12/2009 | Galloway et al. | 711/114 |
| 2010/0058335 A1 * | 3/2010 | Weber | 718/1 |
| 2011/0022812 A1 * | 1/2011 | van der Linden et al. | 711/163 |

FOREIGN PATENT DOCUMENTS

WO  WO 2006/045844 A1 *  5/2006

* cited by examiner

*Primary Examiner* — Jennifer To
(74) *Attorney, Agent, or Firm* — Suiter Swantz pc llo

(57) ABSTRACT

A storage array controller may include a virtual machine manager for managing a storage array application virtual machine and a dedicated multiplexer virtual machine. The storage array application virtual machine and the dedicated multiplexer virtual machine may be communicatively coupled via a plurality of virtual machine manager coupling drivers. The storage array controller may also include a dedicated inter controller link for communicatively coupling the storage array controller with a second storage array controller. The dedicated multiplexer virtual machine may be configured for coupling with a second dedicated multiplexer virtual machine included with the second storage array controller via a device driver communicating across the dedicated inter controller link.

19 Claims, 3 Drawing Sheets

SYSTEM AND APPARATUS FOR UTILIZING A VIRTUAL MACHINE TO SUPPORT REDUNDANCY IN A VIRTUAL MACHINE MANAGER PAIR

TECHNICAL FIELD

The present disclosure generally relates to the field of storage networks, and more particularly to a system and apparatus for utilizing a virtual machine to support redundancy in a virtual machine manager pair.

BACKGROUND

The Small Computer System Interface (SCSI) may be utilized with storage array controllers. The storage array controllers may utilize Redundant Array of Inexpensive Disks (RAID) algorithms to organize information across a number of different drives. In SCSI, an initiator accesses Logical Units (LUs) in a target. In the SCSI protocol, the LUs are referred to with a Logical Unit Number (LUN). The initiator may be hosted in a server, and the target may be hosted in a storage array to which the server is connected. Thus, storage array controllers may utilize RAID algorithms to organize physical drives into LUs.

Storage array hardware provides connectivity between the controllers and the physical drives. The drives may be enclosed in the same hardware as the controllers or in an externally connected drive tray. Fibre Channel and SAS are examples of commonly utilized interconnections between controller modules and drives. A server may be connected to a storage controller via a Host Bus Adapter (HBA). The HBA may be directly connected to the storage array via point-to-point connections, or it may be connected over a Storage Array Network (SAN). Again, Fibre Channel, SAS, SATA, or another interconnect may be utilized between the host and the storage array controllers.

In one non-redundant configuration, two storage array controllers may be utilized to access two LUNs defined in a storage array. In this configuration, failure of any of the hardware components in the I/O path may cause a loss of data in the user application running in the host. A combination of redundant hardware components and connectivity along with fail over software may be utilized to provide uninterrupted host connectivity to a SCSI target, even during some hardware component failures. For example, both I/O path redundancy and storage array controller redundancy may be utilized to access LUs in a storage array. However, if multiple failures occur in the same path or at the same level, I/Os to the LUN may still fail. Additionally, this configuration requires additional hardware and software.

Hypervisors provide Virtual Machine (VM) technology and capabilities which allow multiple systems (hardware, operating system, and software applications) to execute on a single hardware platform. This effectively allows consolidation of several individual systems onto a single hardware platform. The VMs are managed by a Virtual Machine manager (VMM) (the hypervisor), which sits between the VMs and the actual hardware. Utilizing a hypervisor and two VMs, it is possible to consolidate the server OS and applications into one VM and the storage array controller firmware into the other VM. However, this configuration lacks the resilience to failures of the previously described redundant configuration (which requires more hardware and software). Specifically, this configuration may include only one RAID application instance.

SUMMARY

A system may include a storage array for storing data. The system may also include a first storage array controller communicatively coupled with the storage array for controlling the storage array. Additionally, the system may include a first virtual machine manager resident on the first storage array controller for managing a first storage services virtual machine, a first storage array application virtual machine, and a first dedicated multiplexer virtual machine. The storage services virtual machine may utilize a multi-path driver. The multi-path driver, the first storage array application virtual machine, and the first dedicated multiplexer virtual machine may be communicatively coupled via a first plurality of virtual machine manager coupling drivers. Further, the system may include a second storage array controller communicatively coupled with the first storage array for controlling the storage array. The second storage array controller may be communicatively coupled with the first storage array controller via a dedicated inter controller link. Still further, the system may include a second virtual machine manager resident on the second storage array controller for managing a second storage array application virtual machine, a first storage array application virtual machine, and a second dedicated multiplexer virtual machine. The second virtual machine manager may also manage a second storage services virtual machine. The second storage array application virtual machine and the second dedicated multiplexer virtual machine may be communicatively coupled via a second plurality of virtual machine manager coupling drivers. The first dedicated multiplexer virtual machine and the second dedicated multiplexer virtual machine may be communicatively coupled via a plurality of device drivers communicating across the dedicated inter controller link.

A storage array controller may include a virtual machine manager for managing a storage array application virtual machine and a dedicated multiplexer virtual machine. The storage array application virtual machine and the dedicated multiplexer virtual machine may be communicatively coupled via a plurality of virtual machine manager coupling drivers. The storage array controller may also include a dedicated inter controller link for communicatively coupling the storage array controller with a second storage array controller. The dedicated multiplexer virtual machine may be configured for coupling with a second dedicated multiplexer virtual machine included with the second storage array controller via a device driver communicating across the dedicated inter controller link.

A storage array controller may include a virtual machine manager for managing a storage services virtual machine, a storage array application virtual machine, and a dedicated multiplexer virtual machine. The storage services virtual machine may utilize a multi-path driver. The multi-path driver, the storage array application virtual machine, and the dedicated multiplexer virtual machine may be communicatively coupled via a plurality of virtual machine manager coupling drivers. The first storage array controller may also include a dedicated inter controller link for communicatively coupling the storage array controller with a second storage array controller. The dedicated multiplexer virtual machine in the first storage array controller may be configured for coupling with a second dedicated multiplexer virtual machine included with the second storage array controller via a device driver communicating across the dedicated inter controller link.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
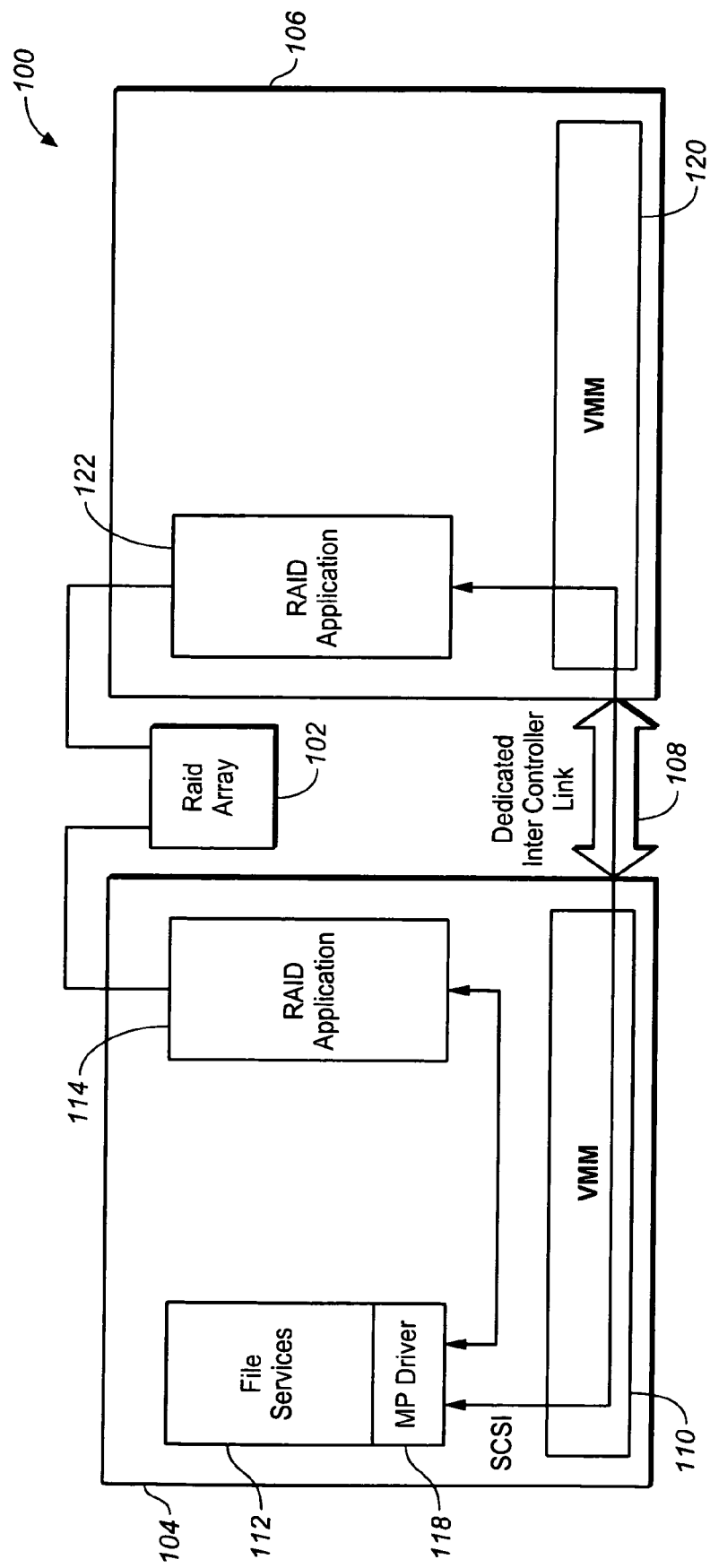
FIG. 1 is a block diagram illustrating a redundant hypervisor storage system in accordance with the present disclosure.
Figure 2:
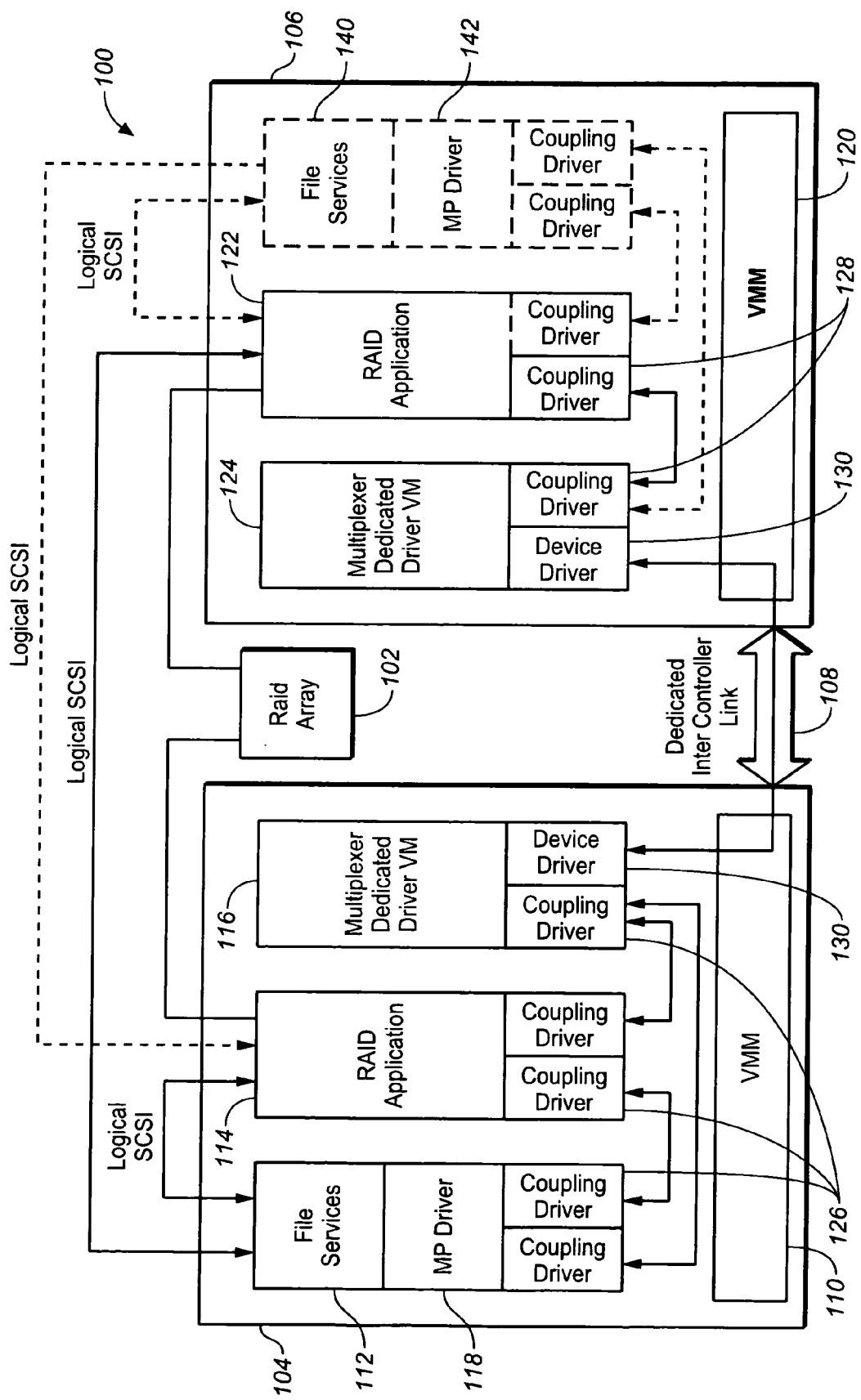
FIG. 2 is a block diagram illustrating multi-path drivers in a redundant hypervisor storage system in accordance with the present disclosure.
Figure 3:
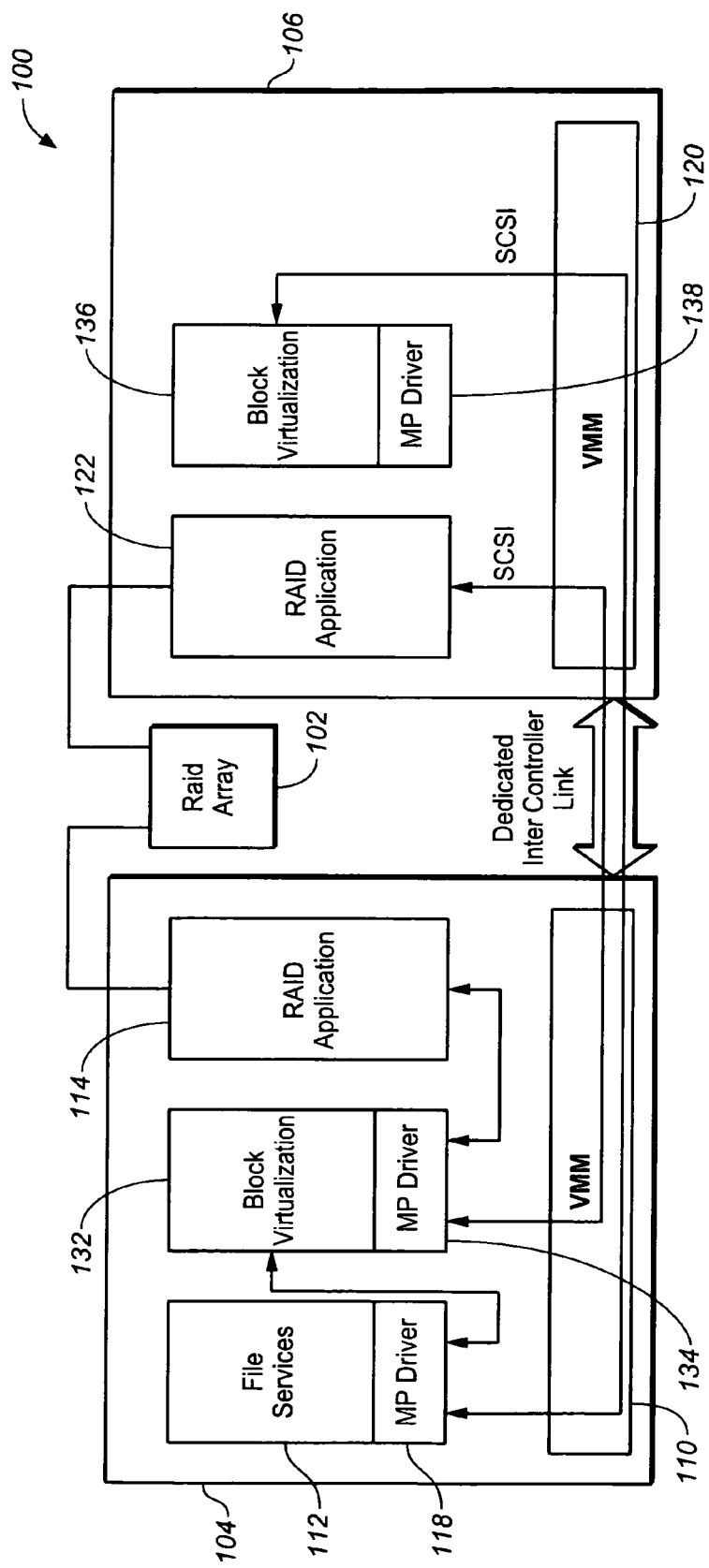
FIG. 3 is a block diagram illustrating stacked applications in a redundant hypervisor storage system in accordance with the present disclosure.

Referring now to FIGS. 1 through 3, a system 100 is described in accordance with the present disclosure. In general terms, the system 100 includes one or more redundant hardware platforms for Small Computer Systems Interface (SCSI) initiators and targets. In one embodiment, one pair of Virtual Machine Manager (VMM) hardware platforms is utilized to provide redundant hardware. The system 100 of the present disclosure may provide inter-virtual machine communication paths so that a first Virtual Machine (VM) may access a SCSI target offered by a second VM. The second VM may be offered within the same VMM as the first VM, or, alternatively, as a VM in the other VMM in the hardware platform pair. For the purposes of the present disclosure, a target VM is said to be "local" if it runs within the same VMM as the initiator VM. Alternatively, a target VM is said to be "remote" if it runs within the other VMM in the pair.

A VMM may be implemented via hardware, software, or the like. In one embodiment, a VMM may be implemented on a storage array controller provided as an expansion card. Alternatively, the VMM may be implemented as a dedicated card. For example, the VMM may be implemented in a storage area network as a controller card containing one or more expansion cards. In another embodiment, the VMM may be implemented on a computer's mother board. The instructions for executing the VMM may be stored in a computer data storage environment, such as a memory chip, or the like. In one embodiment, the instructions may be included on a Read Only Memory (ROM) chip. In another embodiment, the instructions may be included on Flash memory. Alternatively, the instruction may be loaded into a Random Access Memory (RAM) from another storage medium, such as a disk drive. The storage array controller may include a processor for executing the stored instructions. For example, the storage array controller may include electronic circuitry configured for executing computer-executable instructions that when executed on the electronic circuitry cause the electronic circuitry to define a virtual machine manager.

It should also be noted that for the purposes of the present disclosure, the two VMM hardware platforms have a communication path between them that may be dedicated to SCSI communication across the VMMs. In one embodiment, where the VMM hardware platforms include storage array controllers, for instance, the dedicated path may include a dedicated Peripheral Component Interconnect Express (PCI-E) link across a midplane between the controllers. In this configuration, the above-described communication path may be utilized for VM to VM communication across the VMMs in the hardware platform pair. For example, a simple schematic illustrating the communication path described above is illustrated in FIG. 1 (for ease of illustration, the VMs are not shown in this particular figure). In other embodiments, the dedicated path may include a dedicated Infiniband interconnect or another high-speed connect, such as a Fibre Channel link, an SAS link, or a Point-to-Point Ethernet link.

Referring now to FIG. 2, the system 100 includes storage hardware for storing data, such as one or more storage devices (e.g., disk drives, tape drives, memory, or the like). In the embodiment illustrated in FIG. 2, the storage hardware may include a Redundant Array of Inexpensive Disks (RAID) array 102. The system 100 also includes a first storage array controller 104 communicatively coupled with the RAID array 102 for controlling the RAID array 102. Additionally, the system 100 includes a second storage array controller 106 communicatively coupled with the RAID array 102 for controlling the RAID array 102. It will be appreciated that while the present disclosure and the accompanying figures describe the hardware platforms as a pairing of the first storage array controller 104 and the second storage array controller 106, more than two storage array controllers may be utilized with the present invention, including a third storage array controller, a fourth storage array controller, or another storage array controller (e.g., for added redundancy). Further, as described above, the second storage array controller 106 may be communicatively coupled with the first storage array controller 104 via a dedicated inter controller link 108. In one embodiment, the dedicated inter controller link 108 may include a PCI-E link as previously described.

The system 100 includes a first virtual machine manager 110 resident on the first storage array controller 104 for managing a storage services virtual machine (e.g., file services virtual machine 112 or a Virtual Tape Library (VTL) virtual machine), a first storage array application virtual machine (e.g., RAID application virtual machine 114), and a first dedicated multiplexer virtual machine 116. In one embodiment, the storage services virtual machine may be implemented as a higher level storage application (with respect to software for the storage hardware). The higher level storage application may interface with data protection layer software for the storage array. In another embodiment, the storage services virtual machine may be implemented as a data management layer application that interfaces with a data protection layer software application for the storage hardware. The file services virtual machine 112 utilizes a multi-path driver 118 to access the RAID application virtual machine 114 in the same VMM (i.e., the first virtual machine manager 110), as well as another RAID application VM instance in the VMM on the other controller of the controller pair, i.e., a second virtual machine manager 120 resident on the second storage array controller 106 for managing a second storage array application virtual machine (e.g., RAID application virtual machine 122) and a second dedicated multiplexer virtual machine 124.

The RAID application virtual machine 114, the first dedicated multiplexer virtual machine 116, and the multi-path driver 118 may be communicatively coupled via a first plurality of virtual machine manager coupling drivers 126. Additionally, the RAID application virtual machine 122 and the second dedicated multiplexer virtual machine 124 may be communicatively coupled via a second plurality of virtual machine manager coupling drivers 128. A local instance of the RAID application virtual machine 114 may be accessed directly through via a VMM coupling driver 126, while a remote instance of the RAID application virtual machine 122 may be accessed through the multiplexer VM pair (i.e., through the dedicated inter controller link 108 between the first dedicated multiplexer virtual machine 116 and the second dedicated multiplexer virtual machine 124).

In this configuration, the local RAID application virtual machine 114 represents the preferred (higher performance) path to the SCSI target, and the remote RAID application virtual machine 122 represents an alternate (lower performance) path to the SCSI target. It will be appreciated that for the purposes of the present disclosure, the terms "preferred" and "alternate" are defined from the perspective of the multi-path driver 118. For instance, if the local RAID application virtual machine 114 fails (e.g., due to a RAID application code problem like a panic), the multi-path driver 118 may be configured to automatically failover to the remote RAID application virtual machine 122. In this manner, the file services virtual machine 112 may continue to operate without interruption (although it is contemplated that there might be some decrease in performance when switching from the preferred path to the alternate path).

The inter-VMM communication may be implemented utilizing the existing VMM coupling driver mechanism combined with a dedicated multiplexer VM for handling communication between the VMs in the two or more different VMMs. For example, the first dedicated multiplexer virtual machine 116 and the second dedicated multiplexer virtual machine 124 may be communicatively coupled via a plurality of real device drivers 130 communicating across the dedicated inter controller link 108. In VMM terms, the multiplexer VM is a dedicated driver domain that owns all access to the dedicated communications path (between the hardware platforms in the pair) within its VMM. Further, the utilization of VMM coupling drivers allows the user to continue to utilize existing multi-path drivers above the inter-VM communication coupling drivers (as shown in FIG. 2). Logically, the multi-path driver 118 has two SCSI paths to the RAID Application VM instances in this embodiment, and may continue when service is interrupted on either of the RAID application VMs (i.e., the local or remote VMs).

It should also be noted that the second virtual machine manager 120 resident on the second storage array controller 106 may include a second storage services virtual machine (e.g., second file services virtual machine 140). The second file services virtual machine 140 utilizes a second multi-path driver 142 to access the RAID application virtual machine 122 in the same VMM (i.e., the second virtual machine manager 120), as well as the other RAID application VM instance 114 in the VMM on the other controller of the controller pair, i.e., the first virtual machine manager 110 resident on the first storage array controller 104. The RAID application virtual machine 122, the second dedicated multiplexer virtual machine 124, and the second multi-path driver 142 may be communicatively coupled via the second plurality of virtual machine manager coupling drivers 128. In this configuration, the second storage array controller 106 may also act as a primary controller for another host and I/O path to a separate set of LUNs. Thus, in this embodiment, the first storage array controller 104 may act as an alternate path for the second storage array controller 106.

Referring now to FIG. 3, the previously described technique may be extended to multiple layers of dependent VMs. For example, as shown in the figure, the file services virtual machine 112 is utilizing the multi-path driver 118 to access a local and a remote instance of a block virtualization virtual machine. In addition, the Block Virtualization (BV) virtual machine is utilizing a multi-path driver to access a local and a remote instance of the RAID application VM (e.g., the BV VM virtualizes Logical Units (LU) in the RAID applications to provide higher level services, such as snapshots, or the like).

More specifically, the first storage array controller 104 includes a first block virtualization virtual machine 132 resident on the first storage array controller 104. The first block virtualization virtual machine 132 is managed by the first virtual machine manager 110 and utilizes a second multi-path driver 134. The first multi-path driver 118 and the second multi-path driver 134 are communicatively coupled with the first virtual machine manager 110 via the first plurality of virtual machine manager coupling drivers 126 (not shown, see FIG. 2). Further, the second storage array controller 106 includes a second block virtualization virtual machine 136 resident on the second storage array controller 106. The second block virtualization virtual machine 136 is managed by the second virtual machine manager 120 and utilizes a third multi-path driver 138 communicatively coupled with the second virtual machine manager 120 via the second plurality of virtual machine manager coupling drivers 128 (not shown, see FIG. 2).

For simplicity and ease of understanding, the multiplexer VM and the coupling drivers are not shown in FIG. 3. Rather, only the logical SCSI communication paths are shown. However, in an implementation of this disclosure, it will be the multiplexer VMs that handle the communication across the two VMM instances, along with the coupling drivers within each VMM. Additionally, it will be appreciated that while the present disclosure has described the multiplexer VM approach as encompassing SCSI communications, this approach could be utilized for other types of communication as well. For instance, in one embodiment, a pair of RAID application VMs may utilize the techniques of the present disclosure for their private cache mirroring protocol.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
   a storage array for storing data;
   a first storage array controller communicatively coupled with the storage array for controlling the storage array;
   a first virtual machine manager resident on the first storage array controller for managing a storage services virtual machine, a first storage array application virtual machine, and a first dedicated multiplexer virtual machine, the storage services virtual machine utilizing a multi-path driver, the multi-path driver, the first storage array application virtual machine, and the first dedicated multiplexer virtual machine communicatively coupled via a first plurality of virtual machine manager coupling drivers;

a second storage array controller communicatively coupled with the storage array for controlling the storage array, the second storage array controller communicatively coupled with the first storage array controller via a dedicated inter controller link; and a second virtual machine manager resident on the second storage array controller for managing a second storage array application virtual machine and a second dedicated multiplexer virtual machine; the second storage array application virtual machine and the second dedicated multiplexer virtual machine communicatively coupled via a second plurality of virtual machine manager coupling drivers, wherein the first dedicated multiplexer virtual machine and the second dedicated multiplexer virtual machine are communicatively coupled via a plurality of device drivers communicating across the dedicated inter controller link.

2. The system of claim 1, wherein the storage array comprises a Redundant Array of Inexpensive Disks (RAID) array.

3. The system of claim 1, wherein the dedicated inter controller link comprises at least one of a Peripheral Component Interconnect Express (PCI-E) link, a Fibre Channel link, an SAS link, a Point-to-Point Ethernet link, or an Infiniband interconnect.

4. The system of claim 1, wherein the dedicated inter controller link is dedicated to Small Computer Systems Interface (SCSI) communication between the first virtual machine manager and the second virtual machine manager.

5. The system of claim 1, further comprising:
a first block virtualization virtual machine resident on the first storage array controller, the first block virtualization virtual machine managed by the first virtual machine manager, the first block virtualization virtual machine utilizing a second multi-path driver, the first multi-path driver and the second multi-path driver communicatively coupled with the first virtual machine manager via the first plurality of virtual machine manager coupling drivers.

6. The system of claim 1, further comprising:
a second block virtualization virtual machine resident on the second storage array controller, the second block virtualization virtual machine managed by the second virtual machine manager, the second block virtualization virtual machine utilizing a second multi-path driver communicatively coupled with the second virtual machine manager via the second plurality of virtual machine manager coupling drivers.

7. The system of claim 1, wherein the dedicated inter controller link is dedicated to a private cache mirroring protocol.

8. The system of claim 1, wherein the second virtual machine manager resident on the second storage array controller manages a second storage services virtual machine, the second storage services virtual machine utilizing a second multi-path driver.

9. A storage array controller including a processor, comprising:
a virtual machine manager for managing a storage array application virtual machine and a dedicated multiplexer virtual machine, the storage array application virtual machine and the dedicated multiplexer virtual machine communicatively coupled via a plurality of virtual machine manager coupling drivers;

a dedicated inter controller link for communicatively coupling the storage array controller with a second storage array controller; and a storage services virtual machine managed by the virtual machine manager, the storage services virtual machine utilizing a multi-path driver communicatively coupled with the storage array application virtual machine and the dedicated multiplexer virtual machine via the plurality of virtual machine manager coupling drivers, wherein the dedicated multiplexer virtual machine is configured for coupling with a second dedicated multiplexer virtual machine included with the second storage array controller via a device driver communicating across the dedicated inter controller link, the dedicated inter controller link is dedicated to a private cache mirroring protocol.

10. The storage array controller of claim 9, wherein the storage array controller is configured for controlling a storage array comprising a Redundant Array of Inexpensive Disks (RAID) array.

11. The storage array controller of claim 9, wherein the dedicated inter controller link comprises at least one of a Peripheral Component Interconnect Express (PCI-E) link, a Fibre Channel link, an SAS link, a Point-to-Point Ethernet link, or an Infiniband interconnect.

12. The storage array controller of claim 9, wherein the dedicated inter controller link is dedicated to Small Computer Systems Interface (SCSI) communication.

13. The storage array controller of claim 9, further comprising:
a block virtualization virtual machine managed by the virtual machine manager, the block virtualization virtual machine utilizing a multi-path driver communicatively coupled with the virtual machine manager via the plurality of virtual machine manager coupling drivers.

14. A storage array controller including a processor, comprising:
a virtual machine manager for managing a storage services virtual machine, a storage array application virtual machine, and a dedicated multiplexer virtual machine, the storage services virtual machine utilizing a multi-path driver, the multi-path driver, the storage array application virtual machine, and the dedicated multiplexer virtual machine communicatively coupled via a plurality of virtual machine manager coupling drivers; and a dedicated inter controller link for communicatively coupling the storage array controller with a second storage array controller, wherein the dedicated multiplexer virtual machine is configured for coupling with a second dedicated multiplexer virtual machine included with the second storage array controller via a device driver communicating across the dedicated inter controller link, the dedicated inter controller link is dedicated to a private cache mirroring protocol.

15. The storage array controller of claim 14, wherein the storage array controller is configured for controlling a storage array comprising a Redundant Array of Inexpensive Disks (RAID) array.

16. The storage array controller of claim 14, wherein the dedicated inter controller link comprises at least one of a Peripheral Component Interconnect Express (PCI-E) link, a Fibre Channel link, an SAS link, a Point-to-Point Ethernet link, or an Infiniband interconnect.

17. The storage array controller of claim 14, wherein the dedicated inter controller link is dedicated to Small Computer Systems Interface (SCSI) communication.

18. The storage array controller of claim 14, further comprising:
a block virtualization virtual machine managed by the virtual machine manager, the block virtualization virtual machine utilizing a second multi-path driver communicatively coupled with the virtual machine manager via the plurality of virtual machine manager coupling drivers.

19. A storage array controller including a processing, comprising:
a virtual machine manager for managing a storage array application virtual machine and a dedicated multiplexer virtual machine, the storage array application virtual machine and the dedicated multiplexer virtual machine communicatively coupled via a plurality of virtual machine manager coupling drivers;
a dedicated inter controller link for communicatively coupling the storage array controller with a second storage array controller; and
a block virtualization virtual machine managed by the virtual machine manager, the block virtualization virtual machine utilizing a multi-path driver communicatively coupled with the virtual machine manager via the plurality of virtual machine manager coupling drivers, wherein the dedicated multiplexer virtual machine is configured for coupling with a second dedicated multiplexer virtual machine included with the second storage array controller via a device driver communicating across the dedicated inter controller link, the dedicated inter controller link is dedicated to a private cache mirroring protocol.

* * * * *